US008743770B2

(12) United States Patent
Frederiksen et al.

(10) Patent No.: US 8,743,770 B2
(45) Date of Patent: Jun. 3, 2014

(54) SUPPORT FOR USER EQUIPMENT MULTIPLEXING IN RELAY ENHANCED NETWORKS

(75) Inventors: Frank Frederiksen, Klarup (DK);
 Bernhard Raaf, Neuried (DE); Oumer Teyeb, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 315 days.

(21) Appl. No.: 13/062,816

(22) PCT Filed: Sep. 10, 2008

(86) PCT No.: PCT/EP2008/061983
§ 371 (c)(1),
(2), (4) Date: May 11, 2011

(87) PCT Pub. No.: WO2010/028684
PCT Pub. Date: Mar. 18, 2010

(65) Prior Publication Data
US 2012/0188935 A1    Jul. 26, 2012

(51) Int. Cl.
 *H04J 3/08* (2006.01)
 *H04W 28/02* (2009.01)
(52) U.S. Cl.
 CPC ............................. *H04W 28/0263* (2013.01)
 USPC ........................................ 370/315; 710/316
(58) Field of Classification Search
 CPC .................................................. H04W 28/0263
 USPC ............................................................ 370/315
 See application file for complete search history.

(56) References Cited

U.S. PATENT DOCUMENTS

2010/0315989 A1* 12/2010 Reznik et al. ................. 370/315

OTHER PUBLICATIONS

Nokia, "DL LL/L2 control signaling channel encoding structures"3GPP TSG-RAN WG1 LTE AdHoc, (Jun. 27-30, 2006), R1-061907, (8 pages).
Schultz, et al, "Relaying concepts and supporting actions in the context of CGs", (Oct. 31, 2006), XP002530008, (2 pages).
Klein, et al, "Reduction of Signaling Overhead in Beyond 3G MAC-Protocols using Frame Descriptor Tables" vol. 1, (Apr. 2005), (pp. 260-265), XP002530009.
3GPP TS 36.321 V8.1.0 (Mar. 2008) 3rd Generation Partnership Project; Technical Specification Group Radio Access Network; Evolved Universal Terrestrial Radio Access (E-UTRA) Medium Access Control (MAC) protocol specification (Release 8), (30 pages).

(Continued)

*Primary Examiner* — Wei Zhao
*Assistant Examiner* — Lionel Preval
(74) *Attorney, Agent, or Firm* — Harrington & Smith

(57) ABSTRACT

An apparatus processes a first data packet header element of fixed length which identifies a bearer or a logical channel, as well as a configuration parameter indicating the length of an additional second data packet header element inclusive of a length of zero. A combination of the first data packet header element and the second data packet header element identifies a bearer or a logical channel of a user equipment. Data of different user equipments is processed in a transport block data packet by utilizing a packet header of the transport block data packet including combination of the first data packet header element and the second data packet header element for each different combination of bearer or logical channel and user equipment.

38 Claims, 3 Drawing Sheets

(56) References Cited

OTHER PUBLICATIONS

3GPP TS 36.300 V8.4.0 (Mar. 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), (126 pages).

IEEE Std 802.16e™—2005 and IEEE Std 802.16·—2004/Cor1—2005 (Amendment and Corrigendum to IEEE Std 802.16—2004), "IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", (864 pages).

\* cited by examiner

- *SDU: Service Data Unit
- *PDU: Protocol Data Unit
- *D-PDU: Data PDU
- *C-PDU: Control PDU
- *RH: RLC Header
- *RCH: RLC Control Header
- *MH: MAC Header
- *MCH: MAC Control Header
- *TBH: Transport Block Header

SUPPORT FOR USER EQUIPMENT MULTIPLEXING IN RELAY ENHANCED NETWORKS

FIELD OF THE INVENTION

The present invention relates to an apparatus, system and method for supporting user equipment multiplexing in relay enhanced networks.

RELATED BACKGROUND ART

Relay stations (RS) or relay nodes (RN) have been proposed as coverage extensions in cellular systems since several years ago.

Apart from this main goal of coverage extension, the introduction of relay concepts is also considered to be beneficial in the provision of high-bit-rate coverage in high shadowing environment, in the reduction of the average radio-transmission power at a user equipment (UE), thereby leading to long battery life, in the enhancement of cell capacity and effective throughput such as increasing cell-edge capacity and balancing cell load, and in the enhancement of the overall performance and cost-effectiveness of radio access networks (RAN).

After a careful consideration in pre-standardization activities like the wireless world initiative (WWI) and the wireless world initiative new radio (WINNER), relay systems are today approaching the level of maturity that is needed in ongoing standardization activities. The best evidence of this maturity is the 802.16j standardization of the institute of electrical and electronics engineers (IEEE) where relays are added on top of the IEEE 802.16e standard.

This recent development has increased the pressure to consider relays also in the standardization of long term evolution (LTE) networks which is even stronger due to the expectation of some operators that relay systems will be economically viable due to reduced backhaul and site acquisition costs.

In order to keep LTE competitive it is more than probable that relay extensions to LTE are to be studied within the $3^{rd}$ generation partnership project (3GPP) in release 9. That is, it is expected that relaying plays an important role. It is considered that the goal is to have relays included in the release 9 agenda.

FIG. 1 illustrates a typical deployment scenario of a LTE radio access network (RAN) with possible radio relayed extensions as described above.

SUMMARY OF THE INVENTION

Therefore, it is an object of the present invention to overcome the problems described above.

According to a first aspect of the present invention, there is provided an apparatus, comprising means configured to process a first data packet header element of fixed length which identifies a bearer or a logical channel; means configured to process a configuration parameter indicating the length of an additional second data packet header element inclusive of a length of zero, wherein a combination of the first data packet header element and the second data packet header element identifies a bearer or a logical channel of a user equipment; and means configured to process data of different user equipment in a transport block data packet by utilizing a packet header of the transport block data packet comprising a respective combination of the first data packet header element and the second data packet header element for each different combination of bearer or logical channel and user equipment.

Certain modifications of the apparatus according to the first aspect may include the following.

The apparatus may be suitable for supporting user equipment multiplexing in relay enhanced networks.

The second data packet header element may comprise an identifier which identifies different user equipment.

The means configured to process a configuration parameter may be further configured to generate the configuration parameter.

The apparatus may further comprise means configured to provide functionalities of a serving node of a radio access network; and means configured to forward the transport block data packet to and/or from a relay node of the radio access network.

The apparatus may further comprise means configured to provide functionalities of a relay node of a radio access network; and means configured to forward the transport block data packet to and/or from a serving node of the radio access network.

The apparatus may further comprise means configured to receive data according to varying combinations of bearer or logical channel and user equipment.

The received data may be represented by media access control protocol data units.

The apparatus may further comprise means configured to generate a command message instructing the change of the configuration parameter.

The command message may be a radio resource control connection establish message.

The means configured to process data of different user equipment may be further configured to multiplex data of different user equipment into a transport block data packet and to generate a packet header of the transport block data packet comprising a respective combination of the first data packet header element and the second data packet header element for each different combination of bearer or logical channel and user equipment.

The apparatus may further comprise means configured to forward the multiplexed data to relay node of a radio access network.

The apparatus may further comprise means configured to forward the multiplexed data to a support node of a radio access network.

The means configured to process data of different user equipment may be further configured to demultiplex data of different user equipment in a transport block data packet by evaluating a packet header of the transport block data packet comprising a respective combination of the first data packet header element and the second data packet header element for each different combination of bearer or logical channel and user equipment.

The apparatus may further comprise means configured to forward the demultiplexed data to a gateway node.

The apparatus may further comprise means configured to forward the demultiplexed data to different user equipment.

The demultiplexed data may be represented by media access control protocol data units.

The apparatus may further comprise means configured to generate a confirmation message confirming receipt of a command message instructing the change of the configuration parameter.

The confirmation message may be a radio resource connection confirm message.

According to a second aspect of the present invention, there is provided an apparatus, comprising a first processor configured to process a first data packet header element of fixed length which identifies a bearer or a logical channel; a second processor configured to process a configuration parameter indicating the length of an additional second data packet header element inclusive of a length of zero, wherein a combination of the first data packet header element and the second data packet header element identifies a bearer or a logical channel of a user equipment; and a third processor configured to process data of different user equipment in a transport block data packet by utilizing a packet header of the transport block data packet comprising a respective combination of the first data packet header element and the second data packet header element for each different combination of bearer or logical channel and user equipment.

Certain modifications of the apparatus according to the second aspect may correspond to the modifications of the apparatus according to the first aspect set forth above.

According to a third aspect of the present invention, there is provided a system comprising a support node of a radio access network configured to process a first data packet header element of fixed length which identifies a bearer or a logical channel, to generate and process a configuration parameter indicating the length of an additional second data packet header element inclusive of a length of zero, wherein a combination of the first data packet header element and the second data packet header element identifies a bearer or a logical channel of a user equipment, and to process data of different user equipment in a transport block data packet by utilizing a packet header of the transport block data packet comprising a respective combination of the first data packet header element and the second data packet header element for each different combination of bearer or logical channel and user equipment; and a relay node of a radio access network configured to process a first data packet header element of fixed length which identifies a bearer or a logical channel, to process a configuration parameter indicating the length of an additional second data packet header element inclusive of a length of zero, wherein a combination of the first data packet header element and the second data packet header element identifies a bearer or a logical channel of a user equipment, and to process data of different user equipment in a transport block data packet by utilizing a packet header of the transport block data packet comprising a respective combination of the first data packet header element and the second data packet header element for each different combination of bearer or logical channel and user equipment.

Certain modifications of the system according to the third aspect may include the following.

The system may be suitable for supporting user equipment multiplexing in relay enhanced networks.

According to a fourth aspect of the present invention, there is provided a method, comprising processing a first data packet header element of fixed length which identifies a bearer or a logical channel; processing a configuration parameter indicating the length of an additional second data packet header element inclusive of a length of zero, wherein a combination of the first data packet header element and the second data packet header element identifies a bearer or a logical channel of a user equipment; and processing data of different user equipment in a transport block data packet by utilizing a packet header of the transport block data packet comprising a respective combination of the first data packet header element and the second data packet header element for each different combination of bearer or logical channel and user equipment.

Certain modifications of the method according to the fourth aspect may include the following.

The method may be capable supporting user equipment multiplexing in relay enhanced networks.

The second data packet header element may comprise an identifier which identifies different user equipment.

The processing of a configuration parameter may further comprise generating the configuration parameter.

The method may further comprise providing functionalities of a serving node of a radio access network; and forwarding the transport block data packet to and/or from a relay node of the radio access network.

The method may further comprise providing functionalities of a relay node of a radio access network; and forwarding the transport block data packet to and/or from a serving node of the radio access network.

The method may further comprise receiving data according to varying combinations of bearer or logical channel and user equipment.

The received data may be represented by media access control protocol data units.

The method may further comprise generating a command message instructing the change of the configuration parameter.

The command message may be a radio resource control connection establish message.

The processing of data of different user equipment may further comprise multiplexing data of different user equipment into a transport block data packet and generating a packet header of the transport block data packet comprising a respective combination of the first data packet header element and the second data packet header element for each different combination of bearer or logical channel and user equipment.

The method may further comprise forwarding the multiplexed data to relay node of a radio access network.

The method may further comprise forwarding the multiplexed data to a support node of a radio access network.

The processing of data of different user equipment may further comprise demultiplexing data of different user equipment in a transport block data packet by evaluating a packet header of the transport block data packet comprising a respective combination of the first data packet header element and the second data packet header element for each different combination of bearer or logical channel and user equipment.

The method may further comprise forwarding the demultiplexed data to a gateway node.

The method may further comprise forwarding the demultiplexed data to different user equipment.

The demultiplexed data may be represented by media access control protocol data units.

The method may further comprise generating a confirmation message confirming receipt of a command message instructing the change of the configuration parameter.

The confirmation message may be a radio resource connection confirm message.

According to a fifth aspect of the present invention, there is provided a computer program product embodied as a computer readable medium storing instructions which comprise processing a first data packet header element of fixed length which identifies a bearer or a logical channel; processing a configuration parameter indicating the length of an additional second data packet header element inclusive of a length of zero, wherein a combination of the first data packet header element and the second data packet header element identifies a bearer or a logical channel of a user equipment; and processing data of different user equipment in a transport block data packet by utilizing a packet header of the transport block data packet comprising a respective combination of the first data packet header element and the second data packet header element for each different combination of bearer or logical channel and user equipment.

Certain modifications of the computer program product according to the fifth aspect may correspond to the modifications of the method according to the fifth aspect set forth above.

BRIEF DESCRIPTION OF THE DRAWINGS

Other objects, aspects, features and advantages of the present invention are apparent from the following description of the embodiments thereof which is to be taken in conjunction with the accompanying drawings, in which.

DESCRIPTION OF THE PREFERRED EMBODIMENTS

Figure 1:
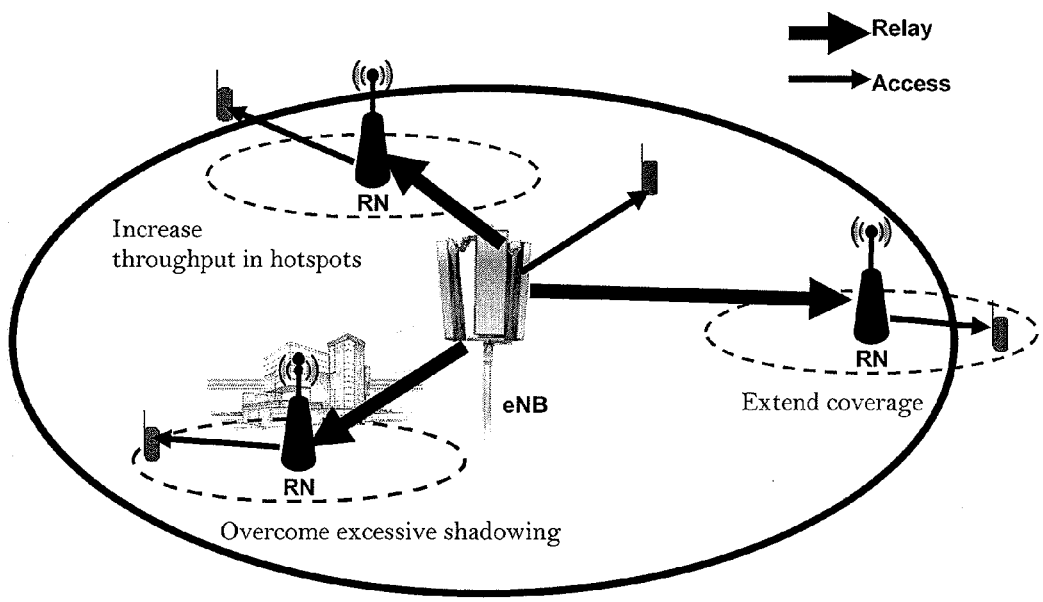
FIG. 1 shows an example of long term evolution radio access network deployment with fixed relay nodes.

In the following, description will be made to what are presently considered to be preferred embodiments of the present invention. It is to be understood, however, that the description is given by way of example only, and that the described embodiments are by no means to be understood as limiting the present invention thereto.

For example, embodiments of the present invention are presently considered to be particularly useful in long term evolution (LTE) networks as defined by the $3^{rd}$ generation partnership project (3GPP).

Furthermore, at present there are many kinds of relay systems proposed starting from a simplest one which amplifies and forwards as e.g. applied in single frequency DVB-H networks (DVB-H: digital video broadcasting -handhelds), ending up to a most complex one, which utilizes a network coding to improve the overall performance.

The most common relay type that is presently proposed for cellular relaying is a detect/forward type of relay, where an input signal is detected and retransmitted using the same procedure as in the original transmission.

In the following, certain embodiments of the present invention are described on the basis of such an approach. However, as stated above, the present invention is not limited thereto.

Moreover, in order to keep LTE economically attractive, certain embodiments of the present invention provide backward compatibility to the present standardization status of 3GPP release 8 ongoing and can thus be implemented under consideration of the following.

Specifically, based on previous 3GPP experiences it can be assumed that full backward compatibility is required from UE side, i.e. terminals according to release 8 and according to the upcoming release 9 should work equally well in networks according to release 8 and release 9, respectively. At the network side software and even hardware updates between standard releases may be possible, but preferably they should be as small as possible. Hence, from UE viewpoint a serving network node should function in exactly the same way as an evolved node B (eNB) according to release 8. Due to this requirement the reduction of eNB functionalities is considered to be difficult when defining relay nodes, and relays need to support all main eNB functions. Therefore, it is considered that relay nodes are capable of flexible resource sharing with the eNB that controls them.

Moreover, in order to simplify the system it can be considered to allow 2 hops at the most (i.e. eNB-UE or eNB-RN-UE), and to consider a tree topology (i.e. no connections between the relay nodes).

However, it is again emphasized that these assumptions are exemplary only and that the present invention can be implemented to cover also other network topologies.

Accordingly, the relay node (RN) can be considered as a surrogate eNB for one or more user equipment on behalf of the eNB (which thus may be referred to as mother eNB). Thus, whether centralized (where the RN forwards the UE data according to the radio resource allocation assigned by the mother eNB) or decentralized (where the RN forwards the UE data by assigning the optimal radio resources within the set of resources it is allowed to use), in the downlink (DL) direction there is a need for multiplexing the data of different user equipment in the eNB and forwarding them to the RN, where the UE data are de-multiplexed and forwarded to the user equipment. In the opposite direction, i.e. the uplink direction, the RN may multiplex data packets received from different user equipment (UE) and forward them to the eNB in a transport block (TB) as well. In this case, the eNB then does de-multiplexing.

Therefore, certain embodiments of the present invention propose an efficient mechanism on the medium access control (MAC) level for accomplishing the multiplexing and de-multiplexing of data of different user equipment.

In the specification of LTE release 8, multiplexing data of different user equipment is not considered as there are no intermediate nodes, like the RN, between the eNB and the UE.

According to WINNER, the multiplexing is done by simply putting the user equipment identity (ID) of each user equipment in the MAC header of the multiplexed MAC PDU (protocol date unit) whose data is included. Albeit this implementation is straightforward, adapting this strategy in LTE would result in the inclusion of a 16 bit UE ID (C-RNTI: cell radio network temporary identifier) in each MAC PDU, which would be a large overhead.

In mobile WiMAX (worldwide interoperability for microwave access), each connection is identified by a 16 bit connection identifier (CID) and this is used in the MAC header, and as such it is similar to the WINNER proposal when it comes to UE multiplexing.

Thus, according to certain embodiments of the present invention mechanisms are proposed to implement user equipment multiplexing in a more efficient way.

These mechanisms comprise the advantage of providing a backward compatible solution for user equipment multiplexing and are based on the following.

The logical channel ID (LCID), which is used in release 8 of the LTE to identify different bearers of the same user equipment, can be used to identify bearers from a set of different user equipment instead.

However, this field is only 5 bits long, and of the 32 possible addresses, 5 are already reserved for control information. Thus, only 27 addresses are left which means a maximum of 27 users, each with only one bearer, can be supported by a RN (This is under the assumption that the RN is controlling issues like discontinuous reception (DRX) for which the control LCID are reserved for. If these functionalities are controlled by the mother eNB, there is a maximum of only 4 bearers, i.e. 27 divided by 6, since in this case each user equipment needs 1 LCID for data and 5 for control).

Since it is very likely to have more than one active bearer per user equipment, the actual number of supported user equipment per RN would be much lower than 27. Moreover, since the maximum number of bearers per user equipment in LTE release 8 is 8, at most 3 user equipment can be supported per RN, if each user equipment can use the maximum number of bearers. Although this solution is very attractive in a sense that the multiplexing of the MAC PDU can still be done as in LTE release 8 and as such use the uplink/downlink (UL/DL) shared channels (SCH) as they are, it is only reasonable for scenarios where there are several relay nodes deployed per eNB and the relay nodes are supposed to support a handful of users or even less.

Figure 2:
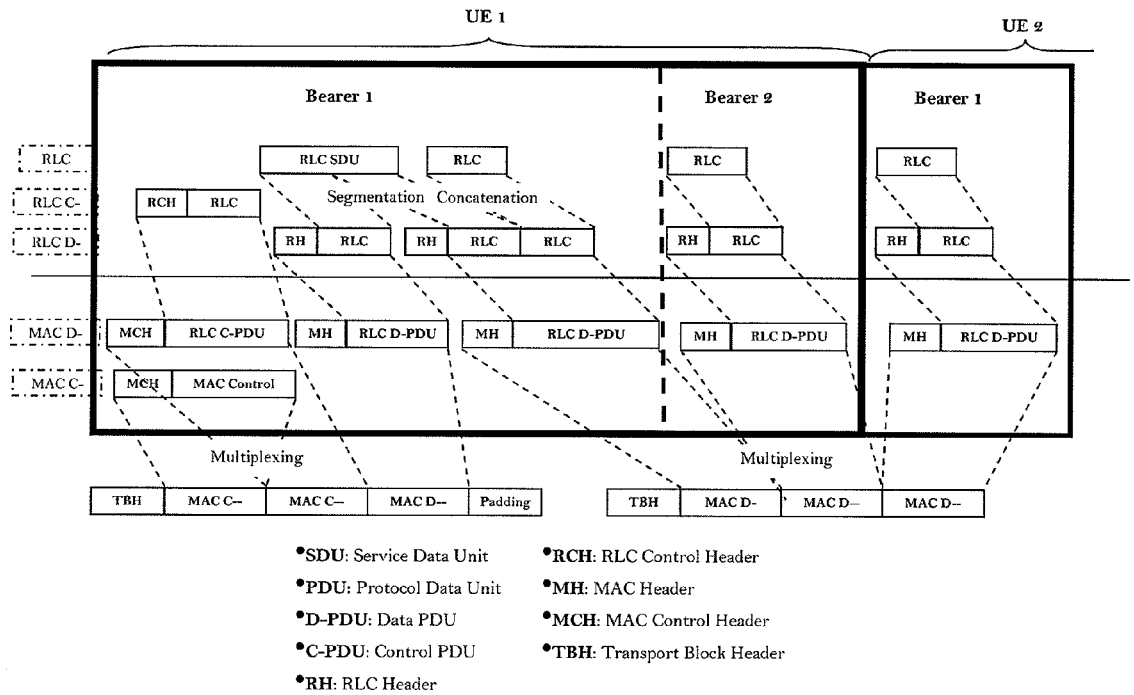
FIG. 2 shows user equipment multiplexing on a media access control level according to certain embodiments of the present invention.

FIG. 2 shows the multiplexing on media access control level according to certain embodiments of the present invention of different user's data at the eNB for relaying, before they are forwarded to the RN. That is, a transport block header (TBH) is used for user multiplexing. A generic format of the frame structure of the transport block header (TBH) is shown in FIG. 3.

Figure 3:
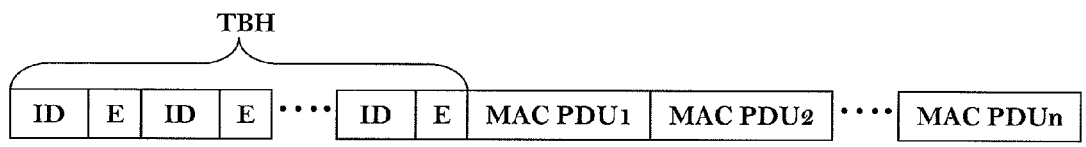
FIG. 3 shows a transport block frame structure as used according to certain embodiments of the present invention.

As can be seen in FIG. 3, the TBH contains the fields ID and E. The ID field is an identification of the user equipment (UE), and the E (Extension) field is a one bit field that indicates whether the next block is another header set or a MAC PDU, i.e. if E=0, MAC PDU will follow, while if E=1, another header set (ID, E) will follow.

As described above, providing a 16 bit UE ID is inefficient. Thus, according to certain embodiments of the present invention a different way of managing the user equipment identifier between the RN and eNB is implemented which requires less address spacing, and thus less overhead.

That is, instead of using a 16 bit UE ID, the implementation is to use a virtual ID (vID) in the sense that the validity of this ID (virtual ID) is limited to the relayed link between relay node and evolved node B, but e.g. not extended to the user equipment. The length of the vID can be a static or a semi-statically configurable variable (i.e. a configuration parameter) and is henceforth referred to as vID Length (vIDL). This configurable variable or configuration parameter is thus set for the link between relay node and evolved node B and defines the length of a virtual identifier inclusive a length of zero, i.e. the virtual identifier is not present at all. If the length is greater than zero, the virtual identifier is actually present in the header fields of the data traffic between the relay node and the evolved node B, while the configuration parameter is always set in relay node and evolved node B, even if by default and/or indicating a length or zero.

Accordingly, the ID field in the header shown in FIG. 3 refers to the virtual ID or the representative ID of a UE. The logical channel identifier (LCID) is inside the header of a MAC PDU as specified in the specification 3GPP TS 36.321 for the current LTE E-UTRAN (evolved universal mobile telecommunications (UMTS) terrestrial radio access network) release 8.

According to certain embodiments of the present invention, the usage/setting of the vIDL that determines the virtual id is as follows:

The vIDL is set to a default value (vIDL-default) when the RN is set up, i.e. unless otherwise modified, the RN will assume the virtual id will be vIDL-default bits long.

A vIDL value of 0 implies that no virtual id is used, and this is equivalent to using the LCID to differentiate bearers regardless of which UE they belong to, as described above. This allows only unique LCID values per relayed UE.

A vIDL value of 1 implies that a one bit virtual id is used, and this is equivalent to having a maximum of 2 relayed UEs that can use the same LCID.

A vIDL value of n implies that an n bit virtual id is used, and this is equivalent to having a maximum of $2^n$ relayed UEs that can use the same LCID.

A vIDL value of 16 implies that the 16 bit actual UE ID is used for UE multiplexing, instead of a virtual id.

Accordingly, the virtual ID has a variable length in bits, i.e. from 0 bits to e.g. 16 bits which are currently specified e.g. in 3GPP specification TS 36.300 for the cell-specific radio network temporary identifier (C-RNTI) of an active user equipment in the given cell. Basically, the length of the new virtual ID varies in line with the number of relayed user equipment between the given RN and the eNB which is known by both the RN and eNB. The eNB can explicitly indicate a virtual ID to RN upon each relayed user equipment connection establishment or implicitly by uniquely mapping from a C-RNTI of a relayed user equipment. For the latter, mapping rules need to be configured to the RN (and eNB) by the eNB or by a network control entity such as an operation and maintenance server or the like to both the RN and the eNB upon initial setup. In case of a 0 bit virtual ID, a relayed user equipment is considered to be identified by the identity of its associated logical channels, that is, different relayed user equipment are assigned with a different set of logical channel IDs. Then the use of a virtual ID for UE multiplexing is rather straightforward.

It is to be noted that if it is required to treat the RN the same way as a UE (for configuration/control functionalities such as DRX), a vID for the RN itself is required. In that case, with a vIDL value of n it will be possible to support only $2^n-1$ user equipment instead of $2^n$ user equipment.

The vID assignment is per RN basis, and it can be done simply by incrementing the maximum value assigned so far. It is to be noted, however, that this is just one possibility as the middle-range relayed user equipment (UE) might be released or handed off and thus the addressing space of vID might run out faster with this way of assignment.

Accordingly, more robust and reassuring ways of assigning the vIDs are described further below.

The RN is aware of the vID assignment, i.e. there is no need to separately communicate the vID assignment to the RN with a separate message, and thus can easily de-multiplex the different MAC PDUs to the different user equipment. According to these embodiments it is possible to dynamically control the needed overhead for control. The control mechanism is able to adapt to the current number of user equipment served by the RN.

The RN-eNB shared channel (SCH) has to be modified in order to accommodate the vID, while the RN-UE link channel remains unchanged and thus LTE release 8 terminals can be used.

According to certain embodiments of the present invention, a simple implementation is to have a vID assigned to each user equipment whenever the user equipment gets connected to a RN. For example, 32 different user equipment with as many bearers as possible per user equipment can be supported with a 5 bit vIDL. If the vIDL does not allow the addition of a new user equipment, the vIDL is reconfigured by using a message exchange as shown in FIG. 4.

Figure 4:
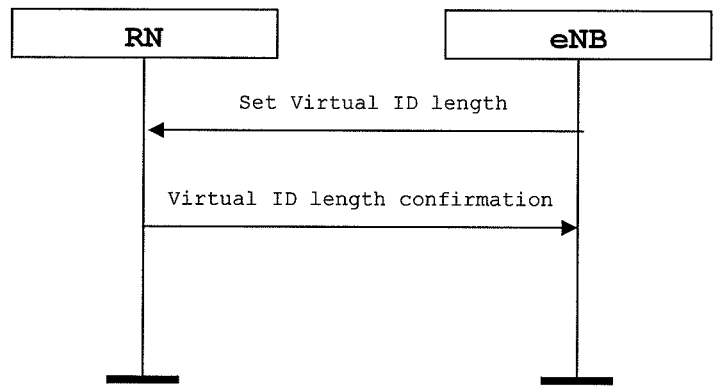
FIG. 4 shows an explicit setting of a virtual identifier length as an implementation example of certain embodiments of the present invention.
Figure 5:
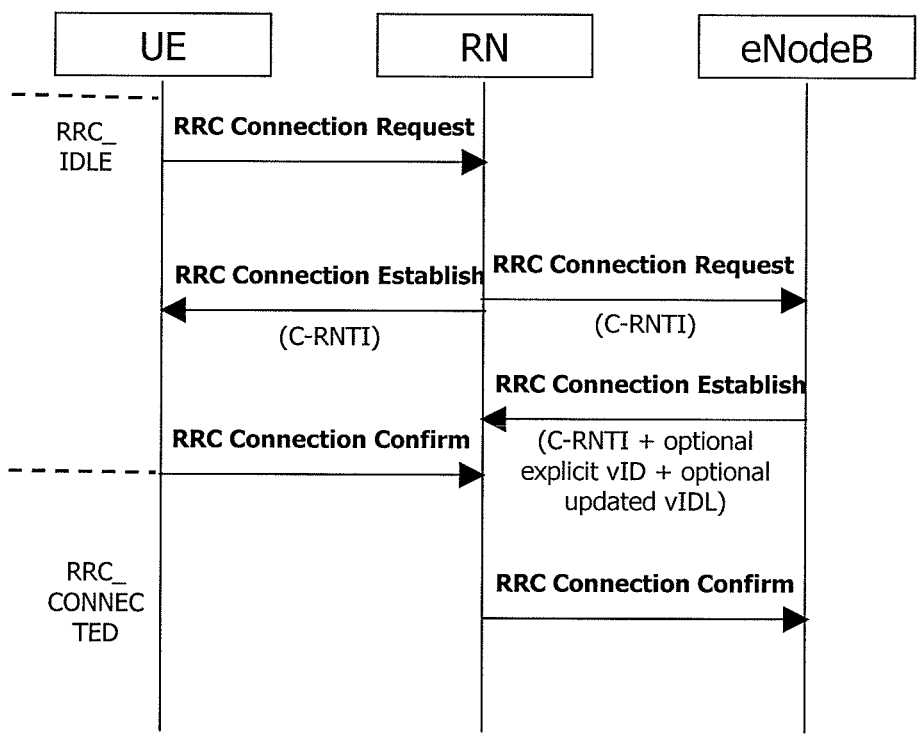
FIG. 5 shows an implicit setting of a virtual identifier length and/or of an optional explicit vID during a radio resource control connection setup as an implementation example of certain embodiments of the present invention.

On the other hand, instead of explicitly setting the vIDL as shown in FIG. 4, an implicit way is also possible. Since radio resource control (RRC) connections are still controlled and/or overseen by the mother eNB, the set vIDL commands can be integrated within the RRC connection establishment messaging upon the addition of a new user equipment as shown in FIG. 5.

In this manner the UE multiplexing is not only dynamic and saves unnecessary overhead, especially if it is done implicitly, it is also robust, since there is no need to reassign different LCID to the bearers when there is a handover.

According to certain embodiments of the present invention, a more advanced implementation is where the LCID addressing space is used more intelligently, allowing even more user equipment per RN than the $2^n$ limit wherein one vID per UE is allocated.

For example, a case shall be considered where there is a vIDL value of 1, by the use of which only two user equipment can be identified. It shall be further considered that two user equipment are already connected and each one has established two bearers, i.e. only 4 of the possible 54 (2·27) possible addresses are used.

Thus, when a third user equipment gets connected to the RN, in the one-vID-per-UE-setting, the vIDL value has to be reconfigured to 2, and the third UE has to be assigned a new vID.

Hence, certain embodiments of the present invention include a more efficient implementation by using one of the other 50 unused values. That is, the vID field becomes irrelevant if the LCID is used only once. On the other hand, although this implementation reduces the probability of vIDL reconfiguration, LCID reassignment for existing bearers might be required during handover.

An implementation of embodiments of the present invention may be achieved by providing a computer program product embodied as a computer readable medium which stores instructions according to the above described embodiments.

Further implementations may include that an access network may be any device, apparatus, unit or means by which a station, entity or other user equipment may connect to and/or utilize services offered by the access network; such services include, among others, data and/or (audio-) visual communication, data download etc.; a user equipment may be any device, apparatus, unit or means by which a system user may experience services from an access network such as a mobile phone, personal digital assistant (PDA), or computer; method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved; generally, any method step is suitable to be implemented as software or by hardware without changing the idea of the invention in terms of the functionality implemented; method steps and/or devices, apparatuses, units or means likely to be implemented as hardware components at a terminal or network element, or any module(s) thereof, are hardware independent and can be implemented using any known or future developed hardware technology or any hybrids of these, using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection; devices, apparatuses, units or means can be implemented as individual devices, apparatuses, units or means, but this does not exclude that they are implemented in a distributed fashion throughout a system, as long as the functionality of the device, apparatus, unit or means is preserved; an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor; and a device may be regarded as an apparatus or as an assembly of more than one apparatus, whether functionally in cooperation with each other or functionally independently of each other but in a same device housing, for example.

In the following, certain embodiments of the present invention are described in still greater detail be referring to particular examples.

EXAMPLE 1

If vIDL is set to 0 when having a $1^{st}$ relayed UE connected; to vIDL=1 when a $2^{nd}$ UE is added; to vIDL=2 when a $3^{rd}$ and $4^{th}$ UE are added; and so forth, then vID can be implicitly known and agreed between RN and eNB without a need of configuration as shown in FIG. 4 and FIG. 5, provided that the vID is assigned according to the increasing (or decreasing) order of C-RNTIs of relayed user equipment. For example, in case vIDL=1 and there are 2 relayed user equipment in the system with CRNTI#1=62 and CRNTI#2=107, then it is automatically known and used by both RN and eNB that vID#1=0 and vID#2=1 if the increasing order is applied. In this case, it is enough to configure the RN about such order of CRNTI and the vID is known implicitly.

EXAMPLE 2

When a radio resource control (RRC) connection is released, any packets (either in the RN or eNB) that belong to that user equipment are flushed, and the vID that was used for the user equipment can be recycled and used for upcoming connections. For example, it shall be assumed that the vIDL is 2 and already 4 user equipment are served by the RN. If the connection of the user equipment with a vID of 1 is released and after a while a new user equipment is connected, there is no need to reconfigure the vIDL to 3, since the new user equipment can simply be mapped to vID=1.

EXAMPLE 3

In order to avoid the vID address space from being filled up in abnormal conditions (such as user equipment powering off suddenly without proper RRC connection release), a housekeeping procedure can be envisioned. The mother eNB can periodically (based on a configurable parameter) check if the connections that have been inactive for a certain duration (a configurable timeout value) are still alive, and recycle the vIDs of the non-responding user equipment for future use.

Thus, described above is an apparatus, comprising means configured to process a first data packet header element of fixed length which identifies a bearer or a logical channel; means configured to process a configuration parameter indicating the length of an additional second data packet header element inclusive of a length of zero, wherein a combination of the first data packet header element and the second data packet header element identifies a bearer or a logical channel of a user equipment; and means configured to process data of different user equipment in a transport block data packet by utilizing a packet header of the transport block data packet comprising a respective combination of the first data packet header element and the second data packet header element for each different combination of bearer or logical channel and user equipment. Further described above is a method, comprising processing a first data packet header element of fixed length which identifies a bearer or a logical channel; processing a configuration parameter indicating the length of an additional second data packet header element inclusive of a length of zero, wherein a combination of the first data packet header element and the second data packet header element identifies a bearer or a logical channel of a user equipment; and processing data of different user equipment in a transport block data packet by utilizing a packet header of the transport block data packet comprising a respective combination of the first data packet header element and the second data packet header element for each different combination of bearer or logical channel and user equipment.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising at least one processor and at least one memory including computer program code, the at least one memory and the computer program code being configured, with the at least one processor, to cause the apparatus to perform at least the following:
process a first data packet header element of fixed length which identifies a bearer or a logical channel;
process a configuration parameter indicating a length of an additional second data packet header element inclusive of a length of zero, wherein a combination of the first data packet header element and the second data packet header element identifies a bearer or a logical channel of a user equipment; and
process data of different user equipment in a transport block data packet by utilizing a packet header of the transport block data packet comprising a respective combination of the first data packet header element and the second data packet header element for each different combination of bearer or logical channel and user equipment.

2. The apparatus according to claim 1, wherein the second data packet header element comprises an identifier which identifies any of different user equipments.

3. The apparatus according to claim 1, wherein the at least one memory and the computer program code are further configured, with the at least one processor, to cause the apparatus to generate the configuration parameter.

4. The apparatus according to claim 1, wherein the at least one memory and the computer program code are further configured, with the at least one processor, to cause the apparatus to provide functionalities of a serving node of a radio access network; and forward the transport block data packet to and/or from a relay node of the radio access network.

5. The apparatus according to claim 1, wherein the at least one memory and the computer program code are further configured, with the at least one processor, to cause the apparatus to provide functionalities of a relay node of a radio access network; and to forward the transport block data packet to and/or from a serving node of the radio access network.

6. The apparatus according to claim 4, wherein the at least one memory and the computer program code are further configured, with the at least one processor, to cause the apparatus to receive data according to varying combinations of bearer or logical channel and user equipment.

7. The apparatus according to claim 6, wherein the received data are represented by media access control protocol data units.

8. The apparatus according to claim 3, wherein the at least one memory and the computer program code are further configured, with the at least one processor, to cause the apparatus to generate a command message instructing the change of the configuration parameter.

9. The apparatus according to claim 8, wherein the command message is a radio resource control connection establish message.

10. The apparatus according to claim 1, wherein the at least one memory and the computer program code are further configured, with the at least one processor, to cause the apparatus to multiplex data of different user equipments into a transport block data packet and to generate a packet header of the transport block data packet comprising a respective combination of the first data packet header element and the second data packet header element for each different combination of bearer or logical channel and user equipment.

11. The apparatus according to claim 10, wherein the at least one memory and the computer program code are further configured, with the at least one processor, to cause the apparatus to forward the multiplexed data to a relay node of a radio access network.

12. The apparatus according to claim 10, wherein the at least one memory and the computer program code are further configured, with the at least one processor, to cause the apparatus to forward the multiplexed data to a support node of a radio access network.

13. The apparatus according to claim 1, wherein the at least one memory and the computer program code are further configured, with the at least one processor, to cause the apparatus to demultiplex data of different user equipment in a transport block data packet by evaluating a packet header of the transport block data packet comprising a respective combination of the first data packet header element and the second data packet header element for each different combination of bearer or logical channel and user equipment.

14. The apparatus according to claim 13, wherein the at least one memory and the computer program code are further configured, with the at least one processor, to cause the apparatus to forward the demultiplexed data to a gateway node.

15. The apparatus according to claim 13, wherein the at least one memory and the computer program code are further configured, with the at least one processor, to cause the apparatus to forward the demultiplexed data to different user equipment.

16. The apparatus according to claim 15, wherein the demultiplexed data are represented by media access control protocol data units.

17. The apparatus according to claim 1, wherein the at least one memory and the computer program code are further configured, with the at least one processor, to cause the apparatus to generate a confirmation message confirming receipt of a command message instructing the change of the configuration parameter.

18. The apparatus according to claim 17, wherein the confirmation message is a radio resource connection confirm message.

19. A system comprising:
a support node of a radio access network configured to process a first data packet header element of fixed length which identifies a bearer or a logical channel, to generate and process a configuration parameter indicating a length of an additional second data packet header element inclusive of a length of zero, wherein a combination of the first data packet header element and the second data packet header element identifies a bearer or a logical channel of a user equipment, and to process data of different user equipment in a transport block data packet by utilizing a packet header of the transport block data packet comprising a respective combination of the first data packet header element and the second data packet header element for each different combination of bearer or logical channel and user equipment; and
a relay node of a radio access network configured to process a first data packet header element of fixed length which identifies a bearer or a logical channel, to process a configuration parameter indicating a length of an additional second data packet header element inclusive of a length of zero, wherein a combination of the first data packet header element and the second data packet header element identifies a bearer or a logical channel of a user equipment, and to process data of different user equipment in a transport block data packet by utilizing a packet header of the transport block data packet comprising a respective combination of the first data packet header element and the second data packet header element for each different combination of bearer or logical channel and user equipment.

20. A method, comprising:
processing a first data packet header element of fixed length which identifies a bearer or a logical channel;
processing a configuration parameter indicating a length of an additional second data packet header element inclusive of a length of zero, wherein a combination of the first data packet header element and the second data packet header element identifies a bearer or a logical channel of a user equipment; and
processing data of different user equipment in a transport block data packet by utilizing a packet header of the transport block data packet comprising a respective combination of the first data packet header element and the second data packet header element for each different combination of bearer or logical channel and user equipment.

21. The method according to claim 20, wherein the second data packet header element comprises an identifier which identifies different user equipment.

22. The method according to claim 20, wherein the processing of a configuration parameter further comprises generating the configuration parameter.

23. The method according to claim 20, further comprising:
providing functionalities of a serving node of a radio access network; and
forwarding the transport block data packet to and/or from a relay node of the radio access network.

24. The method according to claim 20, further comprising:
providing functionalities of a relay node of a radio access network; and
forwarding the transport block data packet to and/or from a serving node of the radio access network.

25. The method according to claim 23, further comprising:
receiving data according to varying combinations of bearer or logical channel and user equipment.

26. The method according to claim 25, wherein the received data are represented by media access control protocol data units.

27. The method according to claim 22, further comprising generating a command message instructing the change of the configuration parameter.

28. The method according to claim 27, wherein the command message is a radio resource control connection establish message.

29. The method according to claim 20, wherein the processing of data of different user equipment further comprises multiplexing data of different user equipment into a transport block data packet and generating a packet header of the transport block data packet comprising a respective combination of the first data packet header element and the second data packet header element for each different combination of bearer or logical channel and user equipment.

30. The method according to claim 29, further comprising:
forwarding the multiplexed data to a relay node of a radio access network.

31. The method according to claim 29, further comprising:
forwarding the multiplexed data to a support node of a radio access network.

32. The method according to claim 20, wherein the processing of data of different user equipment further comprises demultiplexing data of different user equipment in a transport block data packet by evaluating a packet header of the transport block data packet comprising a respective combination of the first data packet header element and the second data packet header element for each different combination of bearer or logical channel and user equipment.

33. The method according to claim 32, further comprising:
forwarding the demultiplexed data to a gateway node.

34. The method according to claim 32, further comprising:
forwarding the demultiplexed data to different user equipment.

35. The method according to claim 34, wherein the demultiplexed data are represented by media access control protocol data units.

36. The method according to claim 20, further comprising generating a confirmation message confirming receipt of a command message instructing the change of the configuration parameter.

37. The method according to claim 36, wherein the confirmation message is a radio resource connection confirm message.

38. A computer program product embodied as a non-transitory computer readable medium, the computer program product storing instructions to perform a method, the method comprising:
processing a first data packet header element of fixed length which identifies a bearer or a logical channel;
processing a configuration parameter indicating a length of an additional second data packet header element inclusive of a length of zero, wherein a combination of the first data packet header element and the second data packet header element identifies a bearer or a logical channel of a user equipment; and
processing data of different user equipment in a transport block data packet by utilizing a packet header of the transport block data packet comprising a respective combination of the first data packet header element and the second data packet header element for each different combination of bearer or logical channel and user equipment.

* * * * *